US012803654B2

(12) United States Patent
Laing

(10) Patent No.: US 12,803,654 B2
(45) Date of Patent: Nov. 17, 2026

(54) MITIGATION OF POOR AXIAL RATIO PERFORMANCE IN SATELLITE COMMUNICATIONS

(71) Applicant: Honeywell International Inc., Charlotte, NC (US)

(72) Inventor: John Laing, Island Heights, NJ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 265 days.

(21) Appl. No.: 18/652,999

(22) Filed: May 2, 2024

(65) Prior Publication Data

US 2025/0343597 A1 Nov. 6, 2025

(51) Int. Cl.
*H04B 7/185* (2006.01)

(52) U.S. Cl.
CPC ................................ *H04B 7/18513* (2013.01)

(58) Field of Classification Search
CPC ............ H04B 7/18513; H04B 7/18543; H04B 7/18508
USPC ................. 455/12.1, 11.1; 342/352; 370/316
See application file for complete search history.

(56) References Cited

U.S. PATENT DOCUMENTS 6,946,990 B2 9/2005 Monk
8,803,733 B2 8/2014 Kolak et al.
10,290,937 B2 5/2019 Oppenlaender
11,705,622 B2 7/2023 Diamond et al.
11,777,203 B2 10/2023 Karch et al.
12,004,089 B2 * 6/2024 Oza ...................... H04B 7/1851
2006/0046638 A1 3/2006 Takeuchi et al.
2012/0249366 A1 10/2012 Pozgay et al.
(Continued)

FOREIGN PATENT DOCUMENTS

CN 115224488 A 10/2022
EP 1679806 B1 9/2007
EP 4096117 A1 11/2022

OTHER PUBLICATIONS

Jinyuan Liu et al., "Analysis of Performance Degradation Introduced by Radome for High-Precision GNSS Antenna," International Journal of Antennas and Propagation, 1529656, 13 pages, (2019). [Retrieved from the Internet Dec. 18, 2024: URL: <https://downloads.hindawi.com/journals/ijap/2019/1529656.pdf>].
(Continued)

*Primary Examiner* — Juan A Torres
(74) *Attorney, Agent, or Firm* — Alston & Bird LLP

(57) ABSTRACT

A method, apparatus, system and computer program product are provided for controlling satellite communication in a satellite communication network during movement of a vehicle comprising one or more antenna elements. Radomes for airborne Satellite Communications (SATCOM) terminals have areas of poor axial ratio (also known as cross-polarization discrimination) due to the aerodynamic nature of the radome. Rather than turning off the power when passing through certain regions, a power spectral density limit is provided to the modem based on an azimuth angle and an elevation angle of the antenna. The power spectral densities may be accessed in a map by azimuth-elevation pairs and are dependent upon axial ratio limits of the satellite communication network. The map corresponds to a shape of the radome, or a physical characteristic of the vehicle.

21 Claims, 9 Drawing Sheets

| 602 | 604 | 600 | 702 | 606 |
|---|---|---|---|---|
| EL | AZ | AXIAL RATIO | CROSS POLAR DISCRIMINATION | PSD LIMIT (dBW/Hz) |
| 77.5 | 5 | 0.1 | -46.1 | 16.1 |
| 77.5 | 145 | 0.1 | -44.8 | 14.8 |
| 7.9 | 65 | 0.4 | -33.5 | 3.5 |
| 2.6 | 95 | 0.5 | -31.4 | 1.4 |
| 60.1 | 35 | 0.5 | -30.2 | 0.2 |
| 60.1 | 125 | 0.6 | -29.7 | -0.3 |
| 18.6 | 65 | 0.7 | -28.2 | -1.8 |
| 50.8 | 75 | 0.8 | -27.2 | -2.8 |
| 50.8 | 15 | 0.8 | -26.9 | -3.1 |
| 43.1 | 105 | 0.8 | -26.6 | -3.4 |
| 43.1 | 45 | 0.8 | -26.3 | -3.7 |
| 43.1 | 35 | 0.9 | -25.9 | -4.1 |
| 36.3 | 115 | 0.9 | -25.4 | -4.6 |
| 13.2 | 115 | 1 | -24.9 | -5.1 |
| 24.2 | 35 | 1.1 | -24.3 | -5.7 |
| 30.1 | 25 | 1.1 | -23.8 | -6.2 |
| 2.6 | 15 | 1.2 | -23.3 | -6.7 |
| 18.6 | 5 | 1.3 | -22.6 | -7.4 |
| 7.9 | 5 | 1.4 | -22 | -8 |
| 18.6 | 175 | 1.8 | -19.8 | -10.2 |
| 2.6 | 175 | 3.1 | -15.1 | -14.9 |

(56) References Cited

U.S. PATENT DOCUMENTS

| | | | | |
|---|---|---|---|---|
| 2020/0252881 | A1 | 8/2020 | Noel et al. | |
| 2024/0340098 | A1* | 10/2024 | Wang ................. | H04B 17/3912 |

OTHER PUBLICATIONS

Lino Gonzalez et al., "A Regulatory Study and Recommendation for EIRP Spectral Density Requirement/Allowance for SOTM Terminals at Ka-Band on WGS System," The 2010 Military Communications Conference, 1992-1997, (2010).

Extended European Search Report Mailed on Sep. 25, 2025 for EP Application No. 25169559, 8 page(s).

* cited by examiner

SAME LONGITUDE: 0° SKEW ANGLE

SAME LATITUDE: 90° SKEW ANGLE

| 602 | 604 | 600 | 702 | 606 |
|---|---|---|---|---|
| EL | AZ | AXIAL RATIO | CROSS POLAR DISCRIMINATION | PSD LIMIT (dBW/Hz) |
| 77.5 | 5 | 0.1 | -46.1 | 16.1 |
| 77.5 | 145 | 0.1 | -44.8 | 14.8 |
| 7.9 | 65 | 0.4 | -33.5 | 3.5 |
| 2.6 | 95 | 0.5 | -31.4 | 1.4 |
| 60.1 | 35 | 0.5 | -30.2 | 0.2 |
| 60.1 | 125 | 0.6 | -29.7 | -0.3 |
| 18.6 | 65 | 0.7 | -28.2 | -1.8 |
| 50.8 | 75 | 0.8 | -27.2 | -2.8 |
| 50.8 | 15 | 0.8 | -26.9 | -3.1 |
| 43.1 | 105 | 0.8 | -26.6 | -3.4 |
| 43.1 | 45 | 0.8 | -26.3 | -3.7 |
| 43.1 | 35 | 0.9 | -25.9 | -4.1 |
| 36.3 | 115 | 0.9 | -25.4 | -4.6 |
| 13.2 | 115 | 1 | -24.9 | -5.1 |
| 24.2 | 35 | 1.1 | -24.3 | -5.7 |
| 30.1 | 25 | 1.1 | -23.8 | -6.2 |
| 2.6 | 15 | 1.2 | -23.3 | -6.7 |
| 18.6 | 5 | 1.3 | -22.6 | -7.4 |
| 7.9 | 5 | 1.4 | -22 | -8 |
| 18.6 | 175 | 1.8 | -19.8 | -10.2 |
| 2.6 | 175 | 3.1 | -15.1 | -14.9 |

FIG. 6

MITIGATION OF POOR AXIAL RATIO PERFORMANCE IN SATELLITE COMMUNICATIONS

TECHNICAL FIELD

The present application relates generally to satellite communications. More specifically, the present application relates to mitigation of poor axial ratio performance in satellite communications.

BACKGROUND

Radomes for airborne Satellite Communications (SATCOM) terminals have areas of poor axial ratio (also known as cross-polarization discrimination) due to the aerodynamic nature of the radome affixed to vehicles such as airplanes and the like. This applies for both fuselage mount and tail/empennage radomes. On satellite networks which support dual polarity operation there is a need for a certain level of axial ratio-performance in order to avoid interfering with other terminals using the opposite polarity/co-frequency bandwidth resource. Many SATCOM terminals therefore cease transmission when using areas of the radome that cause axial ratio performance to exceed certain levels. This results in blockage areas where the terminal cannot operate in certain flight routes for specific periods of times when the poor axial ratio portion of the radome is in the line of sight to the satellite.

Through applied effort, ingenuity, and innovation, identified deficiencies and problems have been solved by developing solutions that are structured in accordance with the embodiments of the present disclosure, many examples of which are described in detail herein.

BRIEF SUMMARY

A method is provided for controlling satellite communication in a satellite communication network during movement of a vehicle comprising one or more antenna elements, the method comprising accessing a map comprising power spectral density limits by azimuth-elevation pair; and based on an antenna position comprising an azimuth angle and an elevation angle of the one or more antenna elements, directing a modem to operate within a power spectral density limit indicated in the map and corresponding to the antenna position.

According to example embodiments, the power spectral density limits are dependent upon an axial ratio limit of the satellite communication network. The map is selected from a plurality of maps, each map being associated with a respective satellite communication network. The map corresponds to at least one of a shape of a radome protecting the one or more antenna elements, or a physical characteristic of the vehicle. The modem operates within the power spectral density limit by controlling at least one of a power level, a symbol rate, or a chip rate. The modem operates within the power spectral density limit by controlling a modulation code based on the at least one of the power level, the symbol rate, or the chip rate. The modem is directed via Open Antenna to Modem Interface Protocol (Open-AMIP).

A system for controlling satellite communication in a satellite communication network during movement of a vehicle comprising one or more antenna elements is provided, the system comprising an apparatus and a modem. The apparatus comprises at least one processor and at least one memory including computer program code, the at least one memory and the computer program code configured to, with the at least one processor, cause the apparatus to at least access a map comprising power spectral density limits by azimuth-elevation pair, and based on an antenna position comprising an azimuth angle and an elevation angle of the one or more antenna elements, direct a modem to operate within a power spectral density limit indicated in the map and corresponding to the antenna position. The modem is configured to receive the power spectral density limit from the apparatus, and in response thereto, control at least one of a power level, a modulation code, a chip rate, or a symbol rate according to the power spectral density limit.

According to example embodiments, the power spectral density limits are dependent upon an axial ratio limit of the satellite communication network. The map corresponds to at least one of a shape of a radome protecting the one or more antenna elements, or a physical characteristic of the vehicle. The modem operates within the power spectral density limit by controlling at least one of a power level, a symbol rate, or a chip rate. The modem operates within the power spectral density limit by controlling a modulation code based on the at least one of the power level, the symbol rate or the chip rate. The modem is directed via Open Antenna to Modem Interface Protocol (Open-AMIP).

An apparatus is provided for controlling satellite communication in a satellite communication network during movement of a vehicle comprising one or more antenna elements, the apparatus comprising at least one processor and at least one memory including computer program code, the at least one memory and the computer program code configured to, with the at least one processor, cause the apparatus to at least access a map comprising power spectral density limits by azimuth-elevation pair, and based on an antenna position comprising an azimuth angle and an elevation angle of the one or more antenna elements, direct a modem to operate within a power spectral density limit indicated in the map and corresponding to the antenna position.

The power spectral density limits are dependent upon an axial ratio limit of the satellite communication network. The map corresponds to at least one of a shape of a radome protecting the one or more antenna elements, or a physical characteristic of the vehicle. The modem is directed via Open Antenna to Modem Interface Protocol (Open-AMIP).

A non-transitory computer readable storage medium is provided, comprising instructions for controlling satellite communication in a satellite communication network during movement of a vehicle comprising one or more antenna elements, when executed by a processor, cause an apparatus comprising at least one processor and at least one memory to access a map comprising power spectral density limits by azimuth-elevation pair, and based on an antenna position comprising an azimuth angle and an elevation angle of the one or more antenna elements, directing a modem to operate within a power spectral density limit indicated in the map and corresponding to the antenna position. The power spectral density limits are dependent upon an axial ratio limit of the satellite communication network. The map corresponds to at least one of a shape of a radome protecting the one or more antenna elements, or a physical characteristic of the vehicle. The modem is directed via Open Antenna to Modem Interface Protocol (Open-AMIP).

An apparatus is provided for controlling satellite communication in a satellite communication network during movement of a vehicle comprising one or more antenna elements, the apparatus comprising means for accessing a map comprising power spectral density limits by azimuth-elevation pair; and based on an antenna position comprising an azimuth angle and an elevation angle of the one or more antenna elements, means for directing a modem to operate within a power spectral density limit indicated in the map and corresponding to the antenna position.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1A:
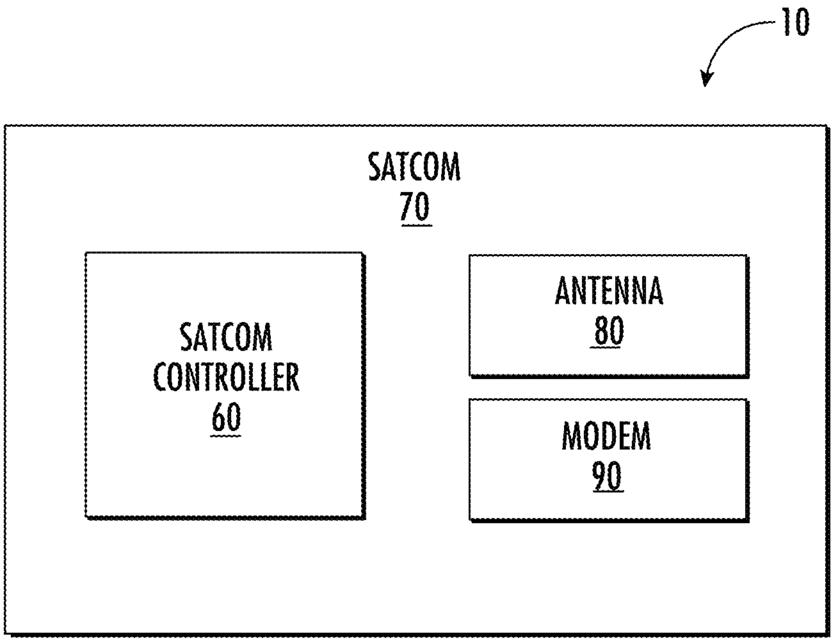

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1A is a schematic view of a system for controlling satellite communication in a satellite communication network accordance with example embodiments.

Figure 1B:
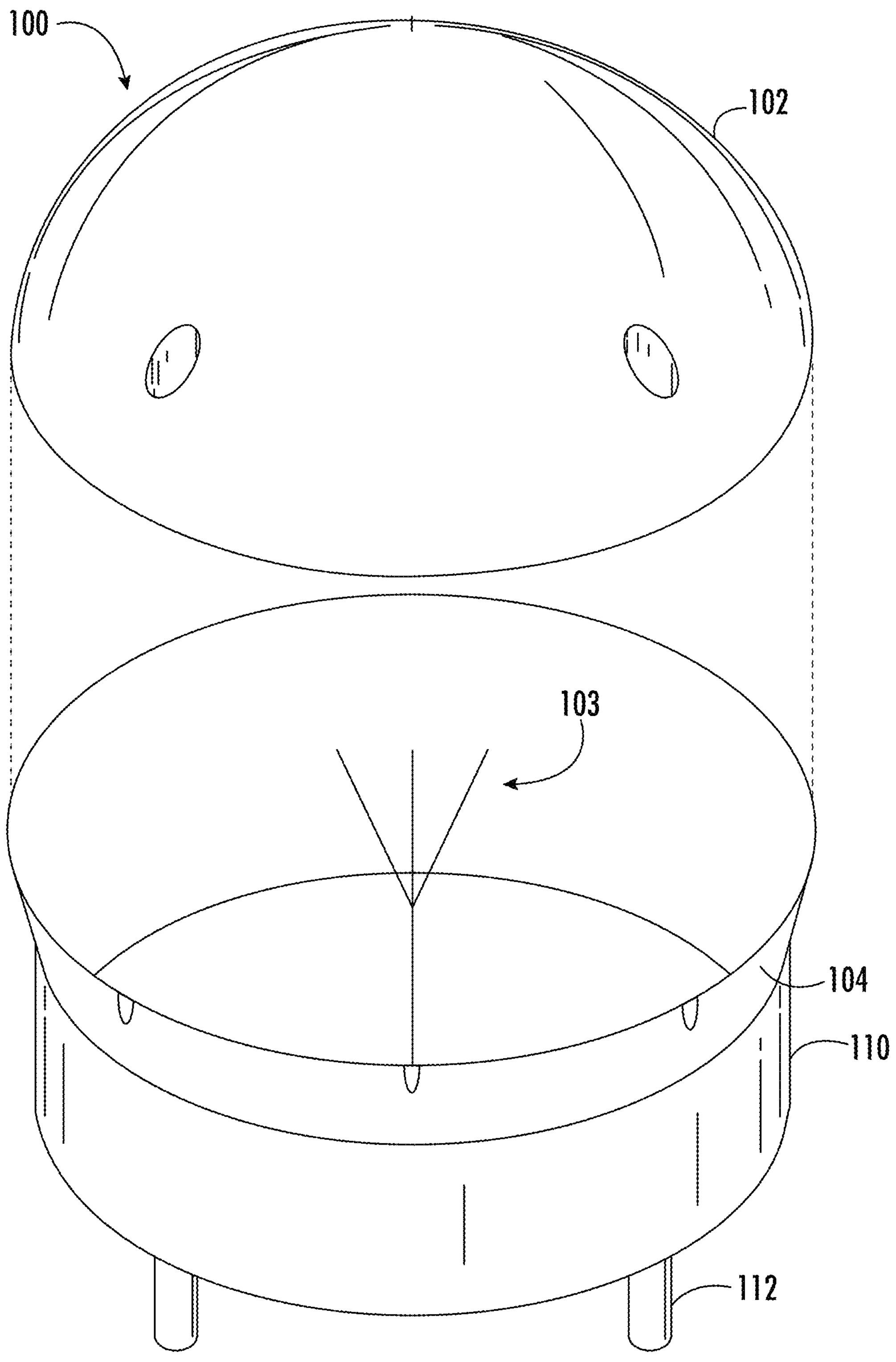

FIG. 1B provides a perspective view of an antenna system, in accordance with at least one example embodiment of the present disclosure.

Figure 2:
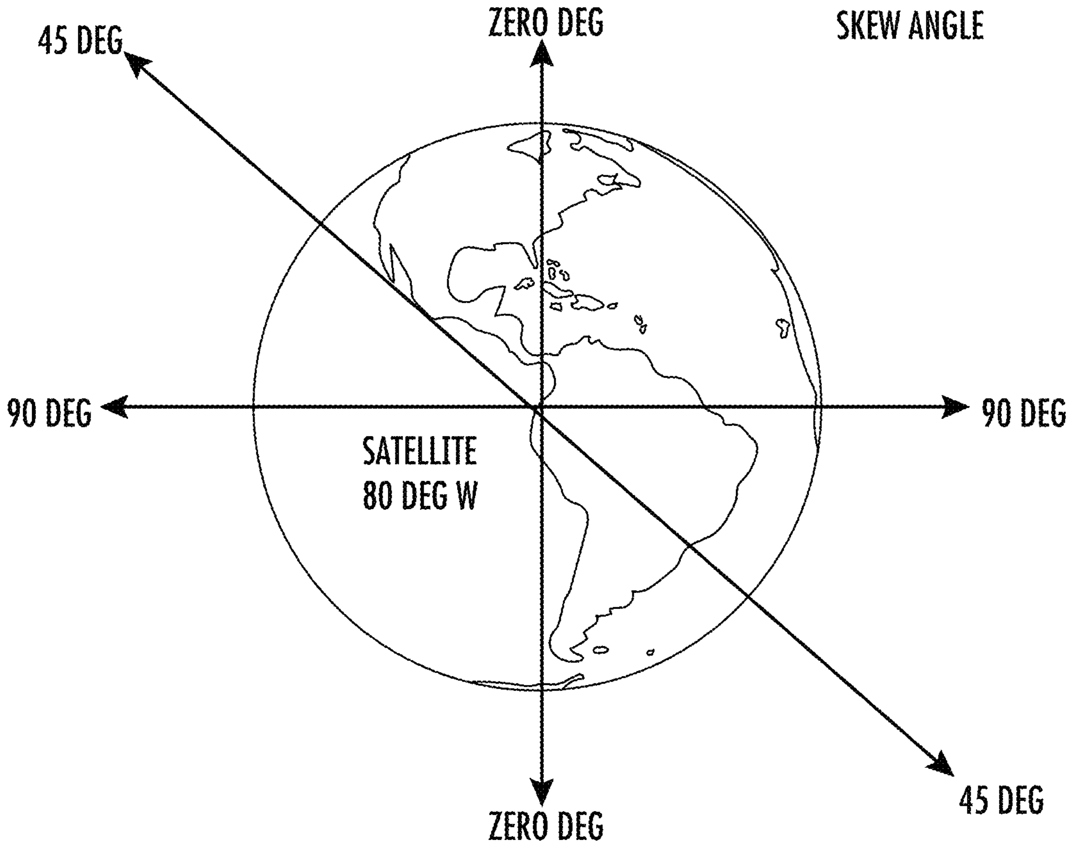

FIG. 2 illustrates example skew angles given an example geostationary satellite positioned along the equator.

Figure 3A:
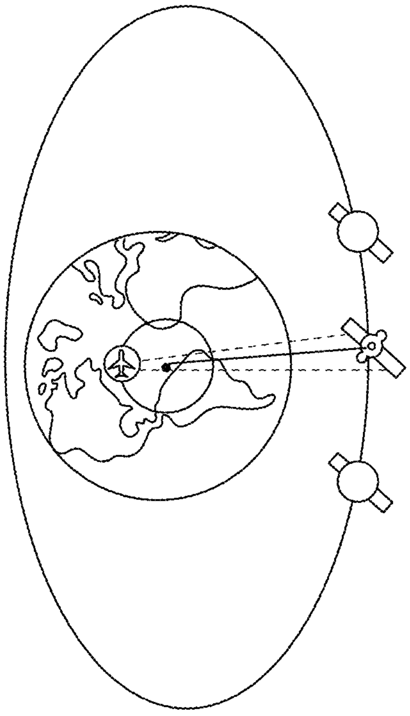
Figure 3B:
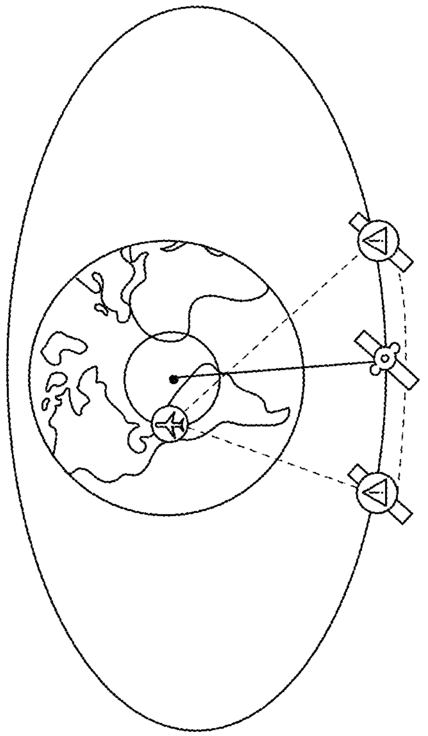

FIGS. 3A and 3B show how a rectangular shaped antenna beam pattern affects satellites on the geostationary arc (GSO).

Figure 3C:
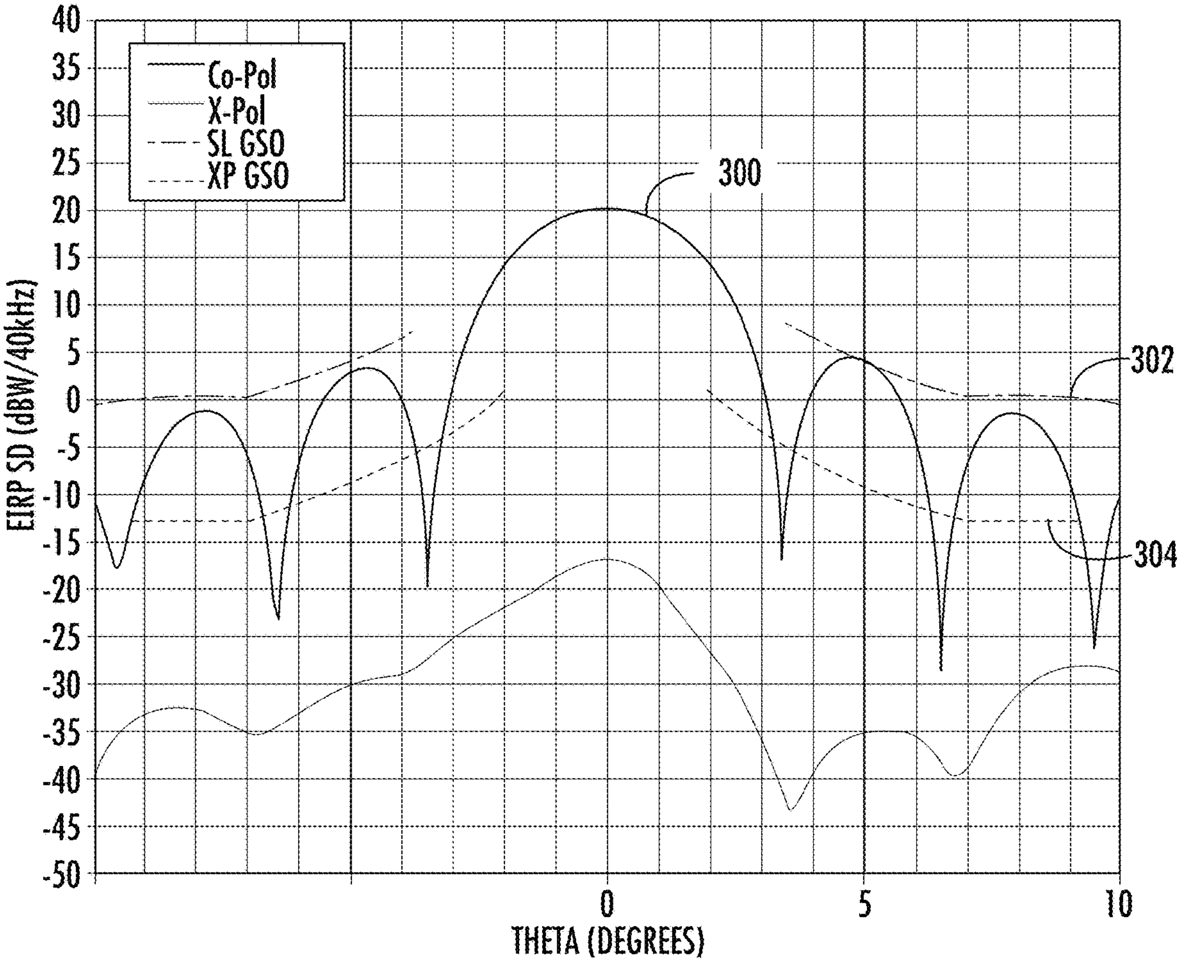

FIG. 3C is a is a representation of an antenna beam pattern.

Figure 4:
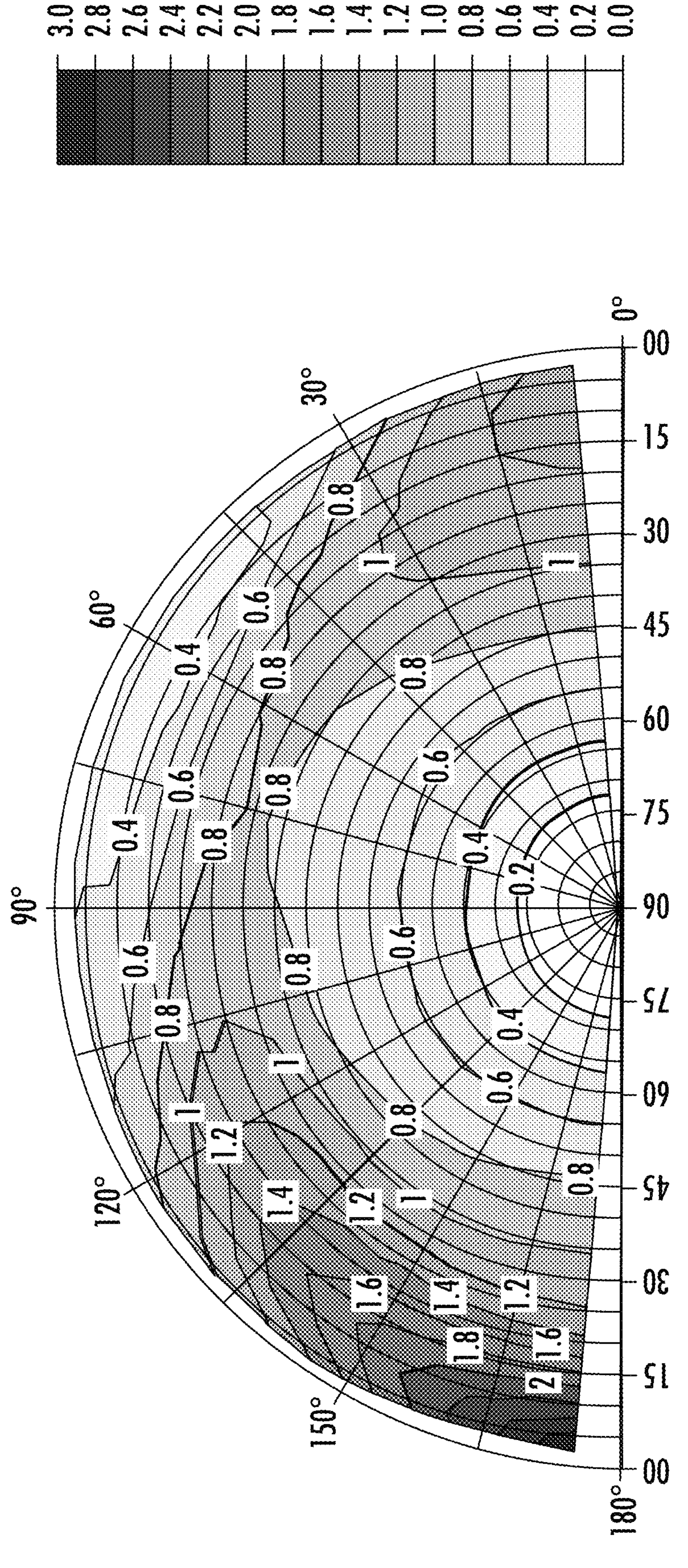

FIG. 4 provides a representation of measurements of axial ratio performance of a radome.

Figure 5:
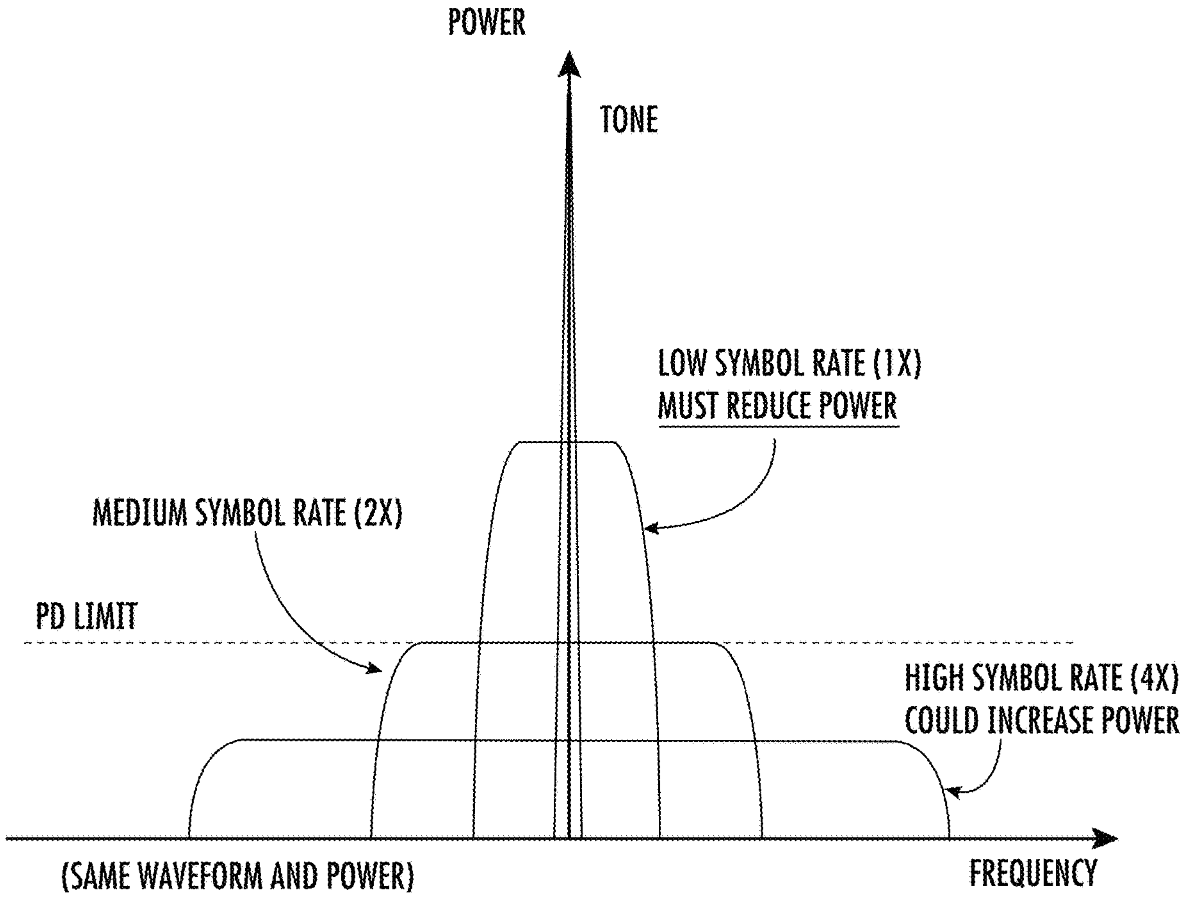

FIG. 5 illustrates a power level of a modem in relation to a power density limit.

FIG. 6 provides a map comprising power spectral density limits by azimuth-elevation pair.

Figure 7:
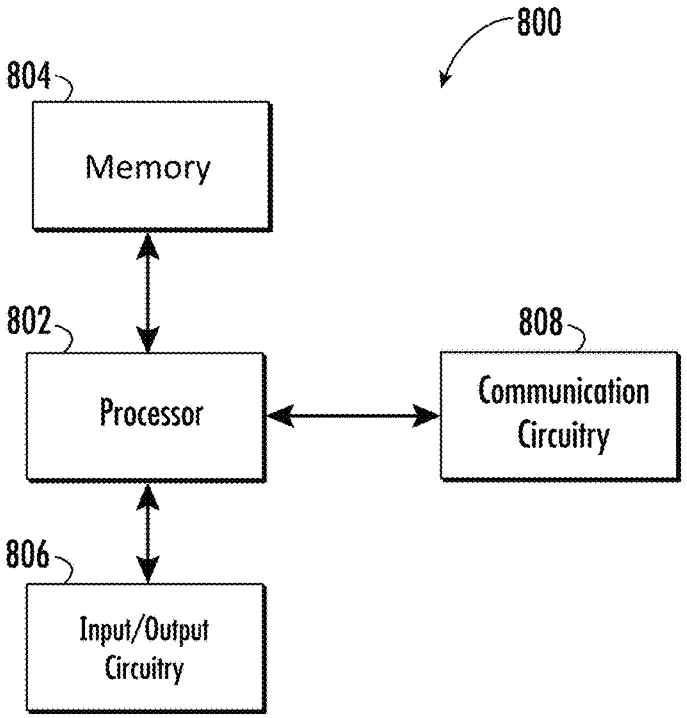

FIG. 7 provides an example apparatus used to implement example embodiment of the present disclosure.

Figure 8:
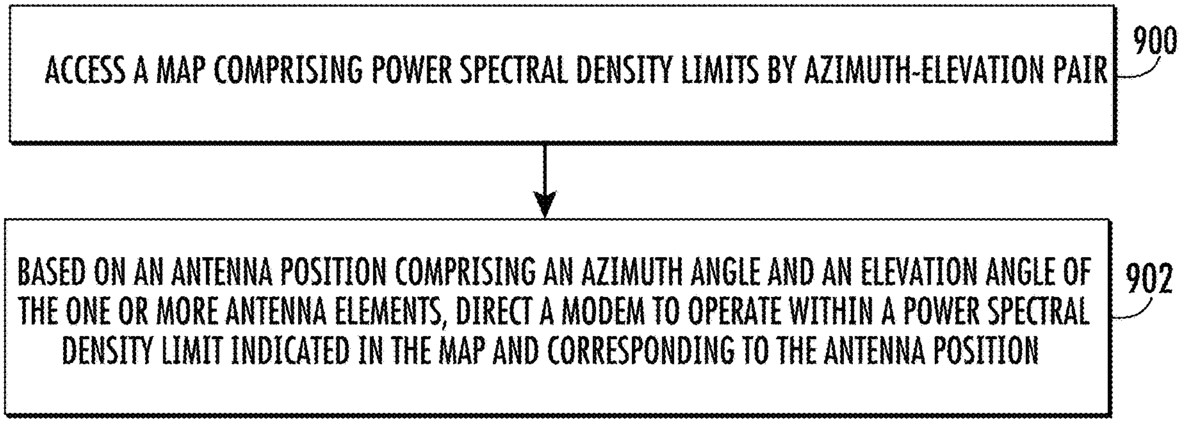

FIG. 8 is a flowchart of operations according to certain example embodiments.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices and/or networks. Similarly, where a computing device is described herein to send data to another computing device, it will be appreciated that the data may be sent directly to another computing device or may be sent indirectly via one or more intermediary computing devices and/or networks.

As used herein, the term "example" means serving as an example, instance, or illustration. Any aspect or design described herein as "example" is not necessarily to be construed as preferred or advantageous over other aspects or designs. Rather, use of the word example is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including", and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "system" refers to, or includes a computer-related entity or an entity related to an operational apparatus with one or more specific functionalities, wherein the entity can be either hardware, a combination of hardware and software, software, or software in execution. As an example, a system may be, but is not limited to being, a process running on a processor, a processor, an object, an executable, a thread of execution, computer-executable instructions, a program, and/or a computer. By way of illustration and not limitation, both an application running on a server and the server can be a system.

As used herein, the term "electrical communication" means that an electric current and/or electric signals are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, terms of approximation, such as “approximately,” “substantially,” or “about,” refer to being within manufacturing or engineering tolerances. For example, terms of approximation may refer to being withing a five percent margin of error.

FIG. 1A is a schematic view of a system for controlling satellite communication in a satellite communication network accordance with example embodiments. In various examples, the vehicle is an aircraft, such as a rotorcraft, an airplane, or a drone. In various other examples, the vehicle is a land craft, such as a car, or a watercraft, such as a ship or a boat. The system 10 of FIG. 1A can be implemented on the vehicle.

The system 10 of FIG. 1A can include a satellite communication system (SATCOM) 70. The SATCOM 70 can be configured to communicate with one or more satellites, such as geostationary satellites. In various examples, the SATCOM 70 may in communication with one or more satellites via radio frequency (RF) signals. The SATCOM 70 may also be configured to communicate with one or more ground stations.

The SATCOM 70 can, in various examples, be configured to provide Internet and/or telephone connectivity to passengers, drivers, or pilots within the vehicle. For example, the SATCOM 70 may provide connectivity to an IP-based packet-switched communications network.

The SATCOM 70 includes an antenna 80 in electrical communication with modem 90. The antenna 80 is described in further detail with regard to FIG. 1B and is configured to receive and transmit RF signals. The modem 90 is configured to demodulate RF signals received by the antenna 80 to a digital signal, and to modulate digital signals generated at the system 10 to RF signals emitted by the antenna 80. The modem 90 can be configured with various modulation codes to transform the digital data into analog data and vice versa. The symbol rate, which may be measured in baud (Bd) or symbols per second, represents the number of symbols transmitted or received per unit of time by the modem 90. A symbol may be transmitted using one or more pulses and the rate of those pulses is know as the chip rate. The chip rate is equal to or larger than the symbol rate, meaning that one symbol is represented by one or more chips. The ratio of chip rate to symbol rate is known as the spreading factor. When there is a spread factor of one, then the chip rate is equal to the symbol rate. When the chip rate twice the symbol rate, then the spread factor is two.

When the SATCOM 70 is operating with relatively high power, the strength of the RF signals emitted by the antenna 80 is greater than when the modem 90 is operating in with lower power. In various examples, the modem 90 of the SATCOM 70 is configured to adjust the strength of the RF signals emitted by the antenna 80 based on variable power levels of the modem 90. When the SATCOM 70 is operating with lower power, basic data services may be still available, but with a lower throughput, as compared to when the SATCOM 70 is operating with higher power. The SATCOM 70 can be configured to operate with various levels of power and various levels of power density. Assuming total power in the signal is constant, increasing the chip rate will spread power over a wider range of frequencies and decrease power density. Keeping the power density at a constant limit requires increasing the power for each increase in chip rate.

The system 10 of FIG. 1A can include a SATCOM controller 60, which may be in data communication with one or more subsystems of the vehicle (not shown). The SATCOM controller 60 may be configured to receive or determine vehicle position data indicative of the current position, which may be used by the SATCOM controller 60 to control a position of the antenna 80. Various algorithms for positioning the antenna 80 may be utilizing or implemented according to example embodiments and may vary depending on the vehicle type or model, antenna type, antenna configuration, and/or the like. The SATCOM controller 60 may control one or more mechanical and/or electric components to control positioning of the antenna 80, including controlling movement in any direction along an x-axis or y-axis, rotating, tilting, and/or the like of any portion of the antenna 80 or antenna elements discussed in further detail with respect to FIG. 1B. The SATCOM controller 60 may therefore control, or may have access to, an azimuth angle and elevation angle of the antenna 80 as the vehicle operates. According to certain embodiments, the SATCOM controller 60 controls positioning of the antenna 80 to maintain or attempt to maintain connectivity with the satellite. In this regard, the azimuth and elevation angles for the antenna 80 may be based on the relative attitude of the antenna as compared to the vehicle (e.g., aircraft), the location (latitude, longitude, altitude) and attitude (heading, pitch, roll) of the aircraft relative to earth, and the location of the satellite relative to earth.

As described according to example embodiments herein, the SATCOM controller 60 may further use the azimuth angle and elevation angle of the antenna 80, by directing the modem 90 to operate within a power spectral density determined based on the azimuth angle and elevation angle, in order to operate within an axial ratio limit of the satellite communication network. According to certain embodiments, the power spectral density is communicated to the modem 90 via Open Antenna to Model Interface Protocol (Open-AMIP). Power spectral density and axial ratio are discussed in further detail herein. The modem 90 is configured to operate within the power spectral density communicated by the SATCOM controller 60 by controlling at least one of its power level, symbol rate, or chip rate. Accordingly, the modem operates within the power spectral density limit by controlling a modulation code based on the at least one of the power level, the symbol rate, or the chip rate.

FIG. 1B provides an exploded view of an example antenna system 100 in accordance with at least one example embodiment. The antenna 80 described with respect to FIG. 1A may therefore include one or more components of the antenna system 100. The example antenna system 100 is an example of an antenna system with which example embodiments of the present disclosure may be utilized. It will be appreciated that example embodiments disclosed herein may be utilized with different antenna systems having different configurations compared to the illustrated example antenna system 100. The antenna system 100 may include a radome top 102 that protects one or more antenna elements 103 and that is coupled, directly or indirectly, to a radome base 104. Each of the antenna elements 103 may be positioned at least partially within the radome top 102 and at least partially within the radome base 104. The radome top 102 may have a concave interior, such that each of the antenna elements 103 may be at least partially positioned within the concave interior. In some embodiments, such as embodiments in which a radome is mounted to the front of a vehicle’s fuselage or nose, the radome top 102 is shaped substantially like a hemisphere, and the radome base 104 and antenna system base 110 substantially cylindrical. In certain embodiments, such as embodiments in which a radome is mounted to the empennage or tail assembly of a vehicle, the radome top 102 is substantially bullet shaped, and the radome base 104 and antenna system base 110 substantially elliptical and cylindrical. However, it will be appreciated that the radome top 102 may be in any shape or configuration determined to provide protection to the one or more antenna elements 103, while also providing a substantially aerodynamic shape of the vehicle portion or component to which it is affixed.

The radome top 102 may comprise material that is substantially transparent to radio frequency (RF) signals such as plastic, polyethylene, and/or the like. For example, the radome top 102 can be formed or otherwise manufactured from material that is substantially transparent to RF signals. The radome top 102 may be configured to cover at least a portion of the antenna elements 103 and/or protect at least a portion of the antenna elements 103 from the environment (e.g., rain, snow, and/or the like).

The radome base 104 may comprise material that is substantially transparent to RF signals such as plastic, polyethylene, and/or the like. The radome base may be configured to cover at least a portion of the antenna elements 103 and/or protect at least a portion of the antenna elements 103 from the environment (e.g., rain, snow, and/or the like). The radome base 104 may be configured to mechanically support the antenna elements 103.

The radome base 104 may be coupled, directly or indirectly, to the antenna system base 110. In some embodiments, the antenna system 100 includes a plurality of standoffs 112 configured to facilitate coupling of the antenna system 100 to a structure (e.g., a building), a vehicle (e.g., an aircraft, a seacraft, or a land vehicle), or equipment. Each standoff 112 may be coupled, directly or indirectly, to the antenna system base 110.

It will be appreciated that FIG. 1B is provided as an example, and alternative shapes and configurations may be contemplated. As used herein, the term radome may refer to any of the radome top 102, radome base 104 and/or combination thereof.

As another example, the antenna elements 103 are configured as a flat panel antenna and may be electrically steered. Axial ratio degradation may occur based on the scan angle of the electrical steering.

The antenna elements 103 are configured to receive and/or transmit electromagnetic waves, such as by electrical connection to a receiver and transmitter (not shown in FIG. 1B). The connection may include feedlines configured to feed power to the antenna elements 103. The electromagnetic waves create a communication link between the antenna system 100 and the satellite provided there is sufficient power. The electromagnetic waves are directed to form a beam that optimizes the energy in a specific direction to maintain the link, thus directing the energy to an antenna system of the satellite. In some cases, the beam is dynamically positioned or steered to maintain the connection (e.g., link). However, the aerodynamic shape of the radome along with a changing skew angle between the antenna and satellite due to movement of the vehicle, effects the beam shape and corresponding connectivity in certain types of antenna systems. The effect on signal quality is further explained with respect to axial ratio, discussed in further detail herein.

Certain antenna systems, such as the antenna system of the JetWave™ MCX are configured to communicate with dual polarity satellites. Dual polarity satellites allow up to 2× frequency re-use to the same geographic area, which results in increased capacity for the region. Communication with dual polarity satellites create conditions that are particularly susceptible to poor axial ratio, which can lead to interference with other terminals using the opposite polarity on the same satellite.

Axial ratio is a measure of quality for operation on dual polarity satellites, and more specifically is the ratio of receiving or transmitting at the desired polarity verses receiving or transmitting at the opposite polarity. The power spectral density limits towards adjacent satellites in the geostationary arc can change as the skew angle changes. Certain systems utilize the antenna's skew angle to determine power spectral density limits, which are enforced by the modem.

According to example embodiments provided herein, the skew angle is not only used to limit power spectral density (PSD) (for the purposes of protecting adjacent satellites), but to use axial ratio (as a function of azimuth & elevation) to limit PSD (for the purposes of protecting other terminals utilizing the same satellite). FIG. 2 illustrates example skew angles given an example geostationary satellite positioned along the equator. The skew angle refers to the relative orientation between aircraft antenna and the satellite. In the example of FIG. 2, zero degrees skew angle would apply to any point along the same longitude as the point on the equator directly below the geostationary satellite. A 90 degrees skew angle applies to any point along the equator.

Certain antenna systems are more susceptible to variable and sometimes poor axial ratio than others. For example, systems utilizing a rectangular horn array are impacted because the antenna beam pattern in the long axis of the aperture (azimuth) is much smaller than the short axis of the aperture (elevation). Flat panel antennas may also have irregular beam patterns which causes variable axial ratio depending on the position of the aircraft relative to the satellite. Circular parabolic reflector antennas may be unimpacted or less impacted because the beam pattern is the same, regardless of the skew angle.

FIGS. 3A and 3B show how a rectangular shaped antenna beam pattern affects satellites on the geostationary arc (GSO), depending on the skew angle. FIG. 3A shows the effect of a 0-degree skew angle when the vehicle is at the same longitude as the satellite. FIG. 3B shows the effect of a 90-degree skew angle when the vehicle is at the same longitude as the satellite. The closer an aircraft gets to a satellite, the more rapidly the skew angle changes based on changes in heading, pitch and roll of the aircraft.

FIG. 3C is a plot illustrating an example two dimensional slice, at a specific skew angle of the antenna, of a three dimensional antenna beam pattern, or three dimensional antenna radiation pattern, in comparison to PSD limits set by regulatory authorities such as the International Telecommunication Union (ITU), Federal Communications Commission (FCC), European Telecommunications Standards Institute (ETSI), etc. In the illustrated example, the PSD limit is 20 dBW/40 kHz. It should be appreciated that the limit can change based on the skew angle if the antenna pattern is not symmetrical. Although not illustrated in FIG. 3C, the skew angle can be a third dimension (azimuth, elevation, skew) into the map for an asymmetric antenna pattern. In this regard, FIG. 3C is a plot of the radiation pattern when considering a zero-degree skew angle, perpendicular to the GSO (EL axis), but in general such a plot would vary depending on the skew angle, azimuth, and elevation. The line 300 represents the co-polarization pattern (the radiation pattern of the intended polarity). The Theta=0 in the horizontal axis represents the center point of where the antenna is pointing. The PSD limits 302 are set by a regulatory authority and are in place to protect adjacent satellites on the geostationary arc. When the co-polarization line 300 approaches the PSD limits 302, then the PSD value at the peak of that antenna pattern establishes the PSD limit. The PSD limit is therefore variable based on the skew. The line 304 represents the cross-polarization (e.g., the unintended polarization). The calculation of the PSD limit is described in further detail with respect to FIG. 6 below. An illustration of axial ratio performance with respect to the radome, and at various azimuth angles and elevation angles is described with respect to FIG. 4.

FIG. 4 provides a representation of measurements of axial ratio performance in decibels (dB) through the radome given various azimuth angles and elevation angles, where the horizonal axis of the representation indicates elevation angle measurements, and the rays extending outward from the center of the horizontal axis indicate azimuth angles, or relative antenna bearing. Each point in the representation indicates an axial ratio performance given the respective pointing angle through the radome. For illustrative purposes, FIG. 4 shows measurements only through half of the radome. According to the illustrated example, the associated antenna element(s) themselves may reflect good pure axial ratio and polarization. However, the curvature of the radome can distort the signal depending on the incidence angle. The darkest portion 400 of FIG. 4 indicates azimuth angles and elevation angles for which the axial ratio is high and signal performance is therefore marginal or poor. According to certain embodiments, such areas may be directly aft, where the incidence angle of the signal to the radome is high.

When poor axial ratio conditions occur, interference with other terminals on the same satellite and using the opposite polarity and same frequency is possible. Redesign of the radome could mitigate poor axial ratio but is impractical due to the aerodynamic requirements of the radome. Accordingly, some systems have been designed to cease transmission in non-conforming regions of the radome, resulting in loss of service for certain portions, and sometimes significant areas of the radome.

One mitigation to reduce said interference is to reduce the maximum PSD of the terminal, such as illustrated with respect to FIG. 5. As shown in FIG. 5, variable symbol rates can be applied to reduce power and ensure operation stays below the power spectral density limit. Certain satellite networks and regulatory bodies provide spectral density limits to limit or avoid interference with adjacent satellites. PSD regulatory limits apply to off-axis antenna pattern for the protection of adjacent satellites.

Accordingly, regulatory power spectral density masks are required in order to protect adjacent satellites from interference. Equivalent, Isotropically Radiated Power (EIRP) spectral density (SD) management mechanisms are used for off-axis protection of other satellites on the geostationary arc. The EIRP-SD mechanisms are typically used for asymmetric aperture antennas and the EIRP-SD adjustments are based on the skew angle of the antenna towards the GEO arc to ensure operation within the spectral density limit.

The data from the axial ratio polar plots is used to derive the azimuth angles and elevation angles depending of the power spectral density limit of the carrier in use. The lower the power spectral density limit of the carrier in use, the further the reduction in power and/or the further the increase in symbol rate or chip rate would be required to maintain the PSD limit.

Based on known off-axis PSD limits to adjacent satellites, example embodiments disclosed herein limit the on-axis opposite polarity (also known as Xpol) PSD limit to the same PSD limit as set by the satellite communication network. Example embodiments can therefore use the same EIRP-SD mechanisms to mitigate poor axial ratio, whether or not the antenna aperture is asymmetrical or symmetrical. Accordingly, example embodiments may reduce or remove blockage zones otherwise experienced with regard to certain areas of the radome.

In this regard, enforcing a PSD limit for axial ratio mitigation as provided herein, may not necessarily be regulatory, but would be specific to the satellite network (e.g how close the opposite polarity co-frequency beam is to the terminal location).

Example embodiments can be implemented at least partially by using the EIRP-SD mechanism set forth in the modem/antenna controller protocol Open-AMIP. Instead of providing the modem with EIRP-SD limits based on the antenna's skew angle, the limits are based on a map of power spectral density limits by azimuth-elevation pair, where the power spectral density limits are based on the axial ratio performance such as those illustrated with respect to FIG. 4.

FIG. 6 is an example table that provides an example map comprising power spectral density limits by azimuth-elevation pair (e.g., an azimuth angle and elevation angle). The term map is not intended to be limiting but refers to a data representation of power spectral density limits by azimuth-elevation pair, provided according to example embodiments. A map comprising power spectral density limits by azimuth-elevation pair, provided according to example embodiments, may be specific to a shape or curvature of the radome, and therefore may be specific to a particular vehicle type, vehicle model, physical characteristic of the vehicle, or the like.

According to certain embodiments, the table of FIG. 6 represents the map comprising power spectral density limits by azimuth-elevation pair for a particular radome shape, and construction, such as but not limited to the material and layers of the radome. For illustrative purposes, FIG. 6 shows only a subset of the rows stored in each respective table. It will be appreciated that any level of granularity may be utilized in tables such as those of FIG. 6 or the map of power spectral density limits by azimuth-elevation pair. Any configuration of the map made up of FIG. 6 may be contemplated. According to certain embodiments, a separate map may be maintained for each respective satellite communication network in which a vehicle could operate, and the respective map accessed accordingly according to a current satellite communication network in which a vehicle communicates.

With reference to FIG. 6, a closest matching elevation angle and azimuth angle, such as measured with respect to a current positioning of the antenna, are accessed in respective columns 602 and 604, where 602 is the elevation angle of the antenna and 604 is the azimuth angle of the antenna. Values in column 606 are the maximum cross polarization PSD allowed from a terminal (to avoid interference with terminals on same satellite, same frequency, opposite polarity) for a particular satellite network, such as for a satellite communication network with a −30 dBW/Hz PSD interference limit. The values in column 606 could be different depending on the particular network. The maximum axial ratio in column 600 represents a worst case axial ratio for the radome given the azimuth-elevation pair and frequency.

The axial ratios in column 600 may therefore correspond to the axial ratio measurements illustrated with respect to FIG. 4. The axial ratio measurement from column 600 is converted into a cross-polar discrimination in column 702. XPD is calculated as =−20*LOG 10(((10^([Axial ratio]/20))+1)/((10^([Axial ratio]/20))−1)). The corresponding co-polarization PSD limit 606 is based on the XPD obtained from column 702. The co-polarization PSD limit 606 is calculated as −30 dBW/HZ minus the cross-polar discrimination, or XPD in column 702. The co-polarization PSD limit of −30 dBW/Hz is provided as an example maximum allowed co-polarization PSD allowed from a terminal (e.g., to avoid interference with terminals on the same satellite, same frequency, and opposite polarity, for a particular satellite network. −30 dBW/Hz is provided merely as an example and the value may differ according to the satellite communication network.

The map comprising power spectral density limits by azimuth-elevation pair may be stored in memory and accessed by the SATCOM controller 60 to communicate, such as by Open-AMIP, the particular co-polarization PSD limit, based on the azimuth angle and elevation angle of the antenna 80, to the modem 90 while the vehicle is in operation. The modem 90 can then operate within the power spectral density limit by controlling at least one of a power level, a symbol rate or a chip rate, such that the modulation code is changed accordingly. Accordingly, rather than turning off the power to the modem 90 when the vehicle passes through regions which causes the axial ratio to be too high due to, for example, the shape of the radome, example embodiments direct the modem 90 to turn down the power until acceptable axial ratio levels are met. Rather than having no connectivity during travel in such regions, example embodiments may enable network connectivity, which even if degraded, is an improvement over no connectivity otherwise experienced in such regions.

FIG. 7 illustrates a block diagram of an apparatus 800 embodying one more devices or systems disclosed herein, such as but not limited to the system 10, SATCOM controller 60, SATCOM 70, antenna 80, and/or modem 90, in accordance with at least one example embodiment of the present disclosure. Apparatus 800 may additionally or alternatively embody other systems or subsystems of the vehicle.

The apparatus 800 includes processor 802, memory 804, input/output circuitry 806, and/or communications circuitry 808. In some embodiments, the apparatus 800 is configured, using one or more of the sets of circuitry embodied by processor 802, memory 804, input/output circuitry 806, communications circuitry 808, to execute and perform the operations described herein.

In general, the terms computing entity, device, system, and/or similar words used herein interchangeably may refer to, for example, one or more computers, computing entities, desktop computers, distributed systems, terminals, servers or server networks, gateways, switches, processing devices, processing entities, relays, routers, network access points, the like, and/or any combination of devices or entities adapted to perform the functions, operations, and/or processes described herein. In one embodiment, these functions, operations, and/or processes can be performed on data, content, information, and/or similar terms used herein interchangeably. In this regard, the apparatus 800 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term “circuitry” as used herein with respect to components of the apparatuses described herein should therefore be understood to include particular hardware configured to perform the functions associated with the particular circuitry as described herein.

Particularly, the term “circuitry” should be understood broadly to include hardware and, in some embodiments, software for configuring the hardware. For example, in some embodiments, “circuitry” includes processing circuitry, storage media, network interfaces, input/output devices, and/or the like. Alternatively or additionally, in some embodiments, other elements of the apparatus 800 provide or supplement the functionality of another particular set of circuitry. For example, the processor 802 in some embodiments provides processing functionality to any of the sets of circuitry, the memory 804 provides storage functionality to any of the sets of circuitry, the communications circuitry 808 provides network interface functionality to any of the sets of circuitry, and/or the like.

In some embodiments, the processor 802 (and/or co-processor or any other processing circuitry assisting or otherwise associated with the processor) is/are in communication with the memory 804 via a bus for passing information among components of the apparatus 800. In some embodiments, for example, the memory 804 is non-transitory and may include, for example, one or more volatile and/or non-volatile memories. In other words, for example, the memory 804 in some embodiments includes or embodies an electronic storage device (e.g., a computer readable storage medium). In some embodiments, the memory 804 is configured to store information, data, content, applications, instructions, or the like, for enabling the apparatus 800 to carry out various functions in accordance with example embodiments of the present disclosure. For example, when apparatus 800 is embodied by the SATCOM controller 60, the memory 804 may store one or more maps comprising the power spectral density limits by azimuth-elevation pair, or any data representation thereof. The memory 804 may further store computer program configured to access such one or maps, retrieve a power spectral density limit, and direct communication, such as with the processor 802 and communications circuitry 808 of the power spectral density limit to the modem 90.

The processor 802 may be embodied in a number of different ways. For example, in some example embodiments, the processor 802 includes one or more processing devices configured to perform independently. Additionally or alternatively, in some embodiments, the processor 802 includes one or more processor(s) configured in tandem via a bus to enable independent execution of instructions, pipelining, and/or multithreading. The use of the terms “processor” and “processing circuitry” should be understood to include a single core processor, a multi-core processor, and/or multiple processors internal to the apparatus 800.

In an example embodiment, the processor 802 is configured to execute instructions stored in the memory 804 or otherwise accessible to the processor. Alternatively or additionally, the processor 802 in some embodiments is configured to execute hard-coded functionality. As such, whether configured by hardware or software methods, or by a combination thereof, the processor 802 represents an entity (e.g., physically embodied in circuitry) capable of performing operations according to an embodiment of the present disclosure while configured accordingly. Alternatively or additionally, as another example in some example embodiments, when the processor 802 is embodied as an executor of software instructions, the instructions specifically configure the processor 802 to perform the algorithms embodied in the specific operations described herein when such instructions are executed.

As one particular example embodiment, the processor 802 is configured to perform various operations associated with controlling operation of the SATCOM 70. In some such embodiments, the processor 802 includes hardware, software, firmware, and/or a combination thereof to perform such operations.

In some embodiments, the apparatus 800 includes communications circuitry 808. The communications circuitry 808 includes any means such as a device or circuitry embodied in either hardware or a combination of hardware and software that is configured to receive and/or transmit data from/to a network and/or any other device, circuitry, or module in communication with the apparatus 800. In this regard, in some embodiments the communications circuitry 808 includes, for example, a network interface for enabling communications with a wired or wireless communications network. Additionally or alternatively in some embodiments, the communications circuitry 808 includes one or more network interface card(s), antenna(s), bus(es), switch (es), router(s), modem(s), and supporting hardware, firmware, and/or software, or any other device suitable for enabling communications via one or more communications network(s). Additionally or alternatively, the communications circuitry 808 includes circuitry for interacting with the antenna(s) and/or other hardware or software to cause transmission of signals via the antenna(s) or to handle receipt of signals received via the antenna(s). In some embodiments, the communications circuitry 808 enables transmission to and/or receipt of data amongst various components described herein. For example, the communications circuitry 808 may include one or more aspects of the Open-AMIP, and may further include one or more wired connections between the antenna 80 and the modem 90.

Additionally or alternatively, in some embodiments, two or more of the sets of circuitries embodying processor 802, memory 804, input/output circuitry 806, communications circuitry 808, are combined. Alternatively or additionally, in some embodiments, one or more of the processor 802, memory 804, input/output circuitry 806, communications circuitry 808, perform some or all of the functionality described associated with another component. For example, in some embodiments, two or more of the processor 802, memory 804, input/output circuitry 806, communications circuitry 808, are combined into a single module embodied in hardware, software, firmware, and/or a combination thereof.

FIG. 8 is a flowchart of example operations that may be performed by the apparatus 800, such as the SATCOM controller 60, according to certain example embodiments. At operation 900, the apparatus 800, such as the SATCOM controller 60, includes means, such as the processor 802, memory 804 and/or the like, for accessing a map comprising power spectral density limits by azimuth-elevation pair. For example, see the example map of FIG. 6, which may be specifically configured based on, or to correspond to, at least one of a shape of a radome protecting the one or more antenna elements, or a physical characteristic of the vehicle. A map may be selected from a plurality of maps, each map being associated with a respective satellite communication network via which the one or more antenna elements communicates.

At operation 902, the apparatus 800, such as the SATCOM controller 60, includes means, such as the processor 802, memory 804, communications circuitry 808 and/or the like, for, based on an antenna position comprising an azimuth angle and an elevation angle of the one or more antenna elements, directing a modem to operate within a power spectral density limit indicated in the map and corresponding to the antenna position. For example, the SATCOM controller 6 may communicate the power spectral density limit obtained from the map using Open-AMIP to the modem 90.

The modem 90 can then receive the power spectral density limit from the apparatus, and in response thereto, control at least one of a power level, a symbol rate, or a chip rate according to the power spectral density limit. The modem 90 would therefore control its modulation code according to the power level, symbol rate and/or chip rate. The modem 90 could lower the power level, if there was sufficient link margin for the receiver to still be able to demodulate the signal. If there was not enough link margin to only lower the power level, the modem 90 could also change the modulation code (e.g. going from QPSK to BPSK modulation codes) in addition to lowering the power. The change in modulation code would reduce the data rate achieved. The modem could also reduce the power level, change the modulation code, and increase the symbol rate or chip rate. The increased symbol rate can serve to maintain the same data rate that would have otherwise been reduced by the change in modulation code. An increased chip rate only would not increase the symbol rate and would lower the data rate. These changes are also coordinated with the receiver of the signal. Accordingly, the SATCOM 70 may provide connectivity to the satellite communication networks in areas of a vehicle path in which it previously did not.

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for controlling satellite communication in a satellite communication network during movement of a vehicle comprising one or more antenna elements, the method comprising:

accessing a map comprising power spectral density limits by azimuth-elevation pair, the power spectral density limits corresponding to a maximum allowable cross-polarization spectral density based on axial ratio performance associated with at least one of a radome protecting the one or more antenna elements, or a physical characteristic of the vehicle; and based on an antenna position comprising an azimuth angle and an elevation angle of the one or more antenna elements, directing a modem to operate within a power spectral density limit indicated in the map and corresponding to the antenna position.

2. The method according to claim 1, wherein the power spectral density limits are dependent upon an axial ratio limit of the satellite communication network.

3. The method according to claim 1, wherein the map is selected from a plurality of maps, each map being associated with a respective satellite communication network.

4. The method according to claim 1, wherein the map corresponds to at least one of a shape of a radome protecting the one or more antenna elements, or a physical characteristic of the vehicle.

5. The method according to claim 1, wherein the modem operates within the power spectral density limit by controlling at least one of a power level, a symbol rate, or a chip rate.

6. The method according to claim 5, wherein the modem operates within the power spectral density limit by controlling a modulation code based on the at least one of the power level, the symbol rate or the chip rate.

7. The method according to claim 1, wherein the modem is directed via Open Antenna to Modem Interface Protocol (Open-AMIP).

8. A system for controlling satellite communication in a satellite communication network during movement of a vehicle comprising one or more antenna elements, the system comprising:

an apparatus comprising at least one processor and at least one memory including computer program code, the at least one memory and the computer program code configured to, with the at least one processor, cause the apparatus to at least:

access a map comprising power spectral density limits by azimuth-elevation pair, the power spectral density limits corresponding to a maximum allowable cross-polarization spectral density based on axial ratio performance associated with at least one of a radome protecting the one or more antenna elements, or a physical characteristic of the vehicle; and based on an antenna position comprising an azimuth angle and an elevation angle of the one or more antenna elements, direct a modem to operate within a power spectral density limit indicated in the map and corresponding to the antenna position; and a modem, configured to:

receive the power spectral density limit from the apparatus, and in response thereto, control at least one of a power level, a modulation code, a chip rate, or a symbol rate according to the power spectral density limit.

9. The system according to claim 8, wherein the power spectral density limits are dependent upon an axial ratio limit of the satellite communication network.

10. The system according to claim 8, wherein the map corresponds to at least one of a shape of a radome protecting the one or more antenna elements, or a physical characteristic of the vehicle.

11. The system according to claim 8, wherein the modem operates within the power spectral density limit by controlling at least one of the power level, the symbol rate, or the chip rate.

12. The system according to claim 11, wherein the modem operates within the power spectral density limit by controlling a modulation code based on the at least one of the power level, the symbol rate, or the chip rate.

13. The system according to claim 8, wherein the modem is directed via Open Antenna to Modem Interface Protocol (Open-AMIP).

14. An apparatus for controlling satellite communication in a satellite communication network during movement of a vehicle comprising one or more antenna elements, the apparatus comprising at least one processor and at least one memory including computer program code, the at least one memory and the computer program code configured to, with the at least one processor, cause the apparatus to at least:

access a map comprising power spectral density limits by azimuth-elevation pair, the power spectral density limits corresponding to a maximum allowable cross-polarization spectral density based on axial ratio performance associated with at least one of a radome protecting the one or more antenna elements, or a physical characteristic of the vehicle; and based on an antenna position comprising an azimuth angle and an elevation angle of the one or more antenna elements, direct a modem to operate within a power spectral density limit indicated in the map and corresponding to the antenna position.

15. The apparatus according to claim 14, wherein the power spectral density limits are dependent upon an axial ratio limit of the satellite communication network.

16. The apparatus according to claim 14, wherein the map corresponds to at least one of a shape of the radome protecting the one or more antenna elements, or the physical characteristic of the vehicle.

17. The apparatus according to claim 14, wherein the modem is directed via Open Antenna to Modem Interface Protocol (Open-AMIP).

18. A non-transitory computer readable storage medium comprising instructions for controlling satellite communication in a satellite communication network during movement of a vehicle comprising one or more antenna elements, when executed by a processor, cause an apparatus comprising at least one processor and at least one memory to:

accessing a map comprising power spectral density limits by azimuth-elevation pair, the power spectral density limits corresponding to a maximum allowable cross-polarization spectral density based on axial ratio performance associated with at least one of a radome protecting the one or more antenna elements, or a physical characteristic of the vehicle; and based on an antenna position comprising an azimuth angle and an elevation angle of the one or more antenna elements, directing a modem to operate within a power spectral density limit indicated in the map and corresponding to the antenna position.

19. The non-transitory computer readable storage medium according to claim 18, wherein the power spectral density limits are dependent upon an axial ratio limit of the satellite communication network.

20. The non-transitory computer readable storage medium according to claim 18, wherein the map corresponds to at least one of a shape of the radome protecting the one or more antenna elements, or a physical characteristic of the vehicle.

21. The non-transitory computer readable storage medium according to claim 18, wherein the modem is directed via Open Antenna to Modem Interface Protocol (Open-AMIP).

* * * * *